United States Patent
Kobayashi et al.

(10) Patent No.: US 6,914,595 B1
(45) Date of Patent: Jul. 5, 2005

(54) DIGITIZING APPARATUS

(75) Inventors: Mitsugu Kobayashi, Nagoya (JP); Hisao Uehara, Ogaki (JP)

(73) Assignee: Sanyo Electric Co., Ltd. (JP)

( * ) Notice: Subject to any disclaimer, the term of this patent is extended or adjusted under 35 U.S.C. 154(b) by 507 days.

(21) Appl. No.: 09/672,943

(22) Filed: Sep. 28, 2000

(30) Foreign Application Priority Data

Sep. 29, 1999 (JP) ............................................. 11-277093

(51) Int. Cl.⁷ .............................................. G09G 5/00
(52) U.S. Cl. ...................... 345/179; 345/173; 345/180; 345/182; 345/183; 178/18.05; 178/18.06
(58) Field of Search ........................ 345/173, 178–183, 345/76, 179, 77, 35, 36; 178/18.01, 18.03, 18.05, 18.06

(56) References Cited

U.S. PATENT DOCUMENTS

| | | | | |
|---|---|---|---|---|
| 4,827,255 A | * | 5/1989 | Ishii ........................... 340/793 |
| 4,855,724 A | * | 8/1989 | Yang ........................... 340/703 |
| 5,243,332 A | * | 9/1993 | Jacobson ....................... 345/44 |
| 5,502,568 A | * | 3/1996 | Ogawa et al. ............... 356/375 |
| 5,734,377 A | * | 3/1998 | Fukuzaki .................... 345/173 |
| 5,745,085 A | * | 4/1998 | Tomio et al. .................. 345/63 |
| 6,072,450 A | * | 6/2000 | Yamada et al. ................ 345/76 |
| 6,237,507 B1 | * | 5/2001 | Yanagisawa et al. .......... 108/3 |
| 6,244,960 B1 | * | 6/2001 | Takasaka et al. ............. 463/37 |
| 6,377,249 B1 | * | 4/2002 | Mumford ..................... 345/179 |
| 6,531,999 B1 | * | 3/2003 | Trajkovic .................... 345/157 |
| 2001/0019325 A1 | * | 9/2001 | Takekawa .................... 345/157 |

* cited by examiner

Primary Examiner—Alexander Eisen
Assistant Examiner—Kimnhung Nguyen
(74) Attorney, Agent, or Firm—Cantor Colburn LLP

(57) ABSTRACT

Graphics are drawn with an input pen, which is provided with an optical sensor at its tip, on a display surface of an EL display. At this time, the EL display is caused to emit light in dot sequence, and the position of the input pen is detected as coordiante information on the basis of timing of light emission of the EL display and timing of light emission detection of the input pen.

6 Claims, 5 Drawing Sheets

DIGITIZING APPARATUS

BACKGROUND OF THE INVENTION

1. Field of the Invention

The present invention relates to a digitizing apparatus or digitizer to be used as an input device for computer equipment.

2. Description of the Related Art

FIG. 5 is a perspective diagram showing the structure of a digitizer as a digitizing apparatus and FIG. 6 is a block diagram showing its configuration.

A digitizer 1 has a display surface 2 and is connected to computer equipment via a cable 3. On the display surface 2 is displayed a picture 4 in accordance with picture information that is supplied from the computer equipment. By writing a characters or drawing a graphic on the display surface 2 using an input pen 5, the tracing is sent to the computer equipment at predetermined time intervals as coordinate information.

The digitizer 1 comprises a flat display 11, a resistance sheet 12, a display control circuit 13, a coordinate processing circuit 14, a picture memory 15, and a CPU 16. The flat display 11 is formed, for example, from a liquid crystal display (LCD) and positioned on the display surface 2 of the digitizer 1. The flat display 11 receives a picture signal Y together with a horizontal synchronization signal HD and a vertical synchronization signal VD, and displays a picture in accordance with the picture signal Y. The resistance sheet 12 is a pressure-sensitive transparent resistor that is positioned on the display surface 2 while overlapping the flat display 11. The resistance sheet 12 has, for example, a first sheet positioned with a resistance in the horizontal direction overlapping a second sheet positioned with a resistance in the vertical direction, and has its resistance value R change depending on the location receiving pressure.

The display control circuit 13 generates the picture signal Y on the basis of the picture data stored in the picture memory 15 as well as generates the horizontal synchronization signal HD and the vertical synchronization signal VD in synchronous with the picture signal Y, and supplies the picture signal Y, the horizontal synchronization signal HD, and the vertical synchronization signal VD to the flat display 11. The coordinate processing circuit 14 is connected to the resistance sheet 12, and detects on the basis of the resistance value R that is input from the resistance sheet 12 the coordinate of the position receiving pressure on the resistance sheet 12. In the coordinate processing circuit 14, the continuously changing coordinate is detected periodically by sampling the change in resistance value R at a fixed period. The coordinate is then continuously sent to a bus 10 as coordinate information following a predetermined format.

The picture memory 15 stores picture information one screen at a time supplied from the computer equipment that is connected to the digitizer 1 and supplies it to the display control circuit 13. The CPU 16 is, for example, a one-chip microcomputer, is connected via the bus 10 to the display control circuit 13, the coordinate processing circuit 14, and the picture memory 15, and controls the operation of each section in accordance with a predetermined control program. The bus 10 is connected to the computer equipment via an interface, and transfers information from the computer equipment to the picture memory 15 and the CPU 16 as well as transfers coordinate information from the coordinate processing circuit 14 to the computer equipment.

In the above-mentioned digitizer, the tracing drawn with the input pen 5 on the display surface 2 can be continuously converted into numeric values as coordinate information and the information can be loaded into the computer equipment.

In the above-mentioned digitizer, it is necessary to position the resistance sheet 12 so as to overlap the flat display 11. A problem arises in which the structure of the display surface 2 becomes complex. Furthermore, since the resistance sheet 12 has a plurality of sheets, a problem arises in which the display 11 becomes hard to see due to the influence of light interference.

SUMMARY OF THE INVENTION

It is therefore an object of the present invention to simplify the structure of the display device and to design the display device to be easy to see.

The present invention is characterized by obtaining coordinate information from the display surface of the light-emitting display device in which is arranged a plurality of display pixels.

A preferred embodiment comprises an electroluminescence display having a plurality of display pixels arranged in a matrix, and an input pen for contacting the display surface of the above-mentioned display and for detecting the emissive state of the display pixel at the position of contact, and causes the plurality of display pixels to emit light in a predetermined sequence and obtains coordinate information of the position of contact of the above-mentioned input pen.

Furthermore, another preferred embodiment comprises an electroluminescence display having a plurality of display pixels arranged in a matrix, an input pen for contacting the display surface of the above-mentioned display and for detecting the emissive state of the display pixel at the position of contact, a display control circuit for displaying a picture on the above-mentioned display be setting timing of horizontal scanning and vertical scanning and for causing the plurality of display pixels to emit light in dot sequence in accordance with the timing of horizontal scanning and vertical scanning, and a coordinate input processing circuit for generating coordinate information on the basis of change in detection output of the above-mentioned pen with respect to timing of horizontal scanning and vertical scanning of the above-mentioned display control circuit.

According to the present invention, the need to provide a mechanism for coordinate recognition on the display surface of the display device is obviated by directly obtaining coordinate information from the display surface of the light emitting display device.

DETAILED DESCRIPTION OF THE PREFERRED EMBODIMENTS

Figure 1:
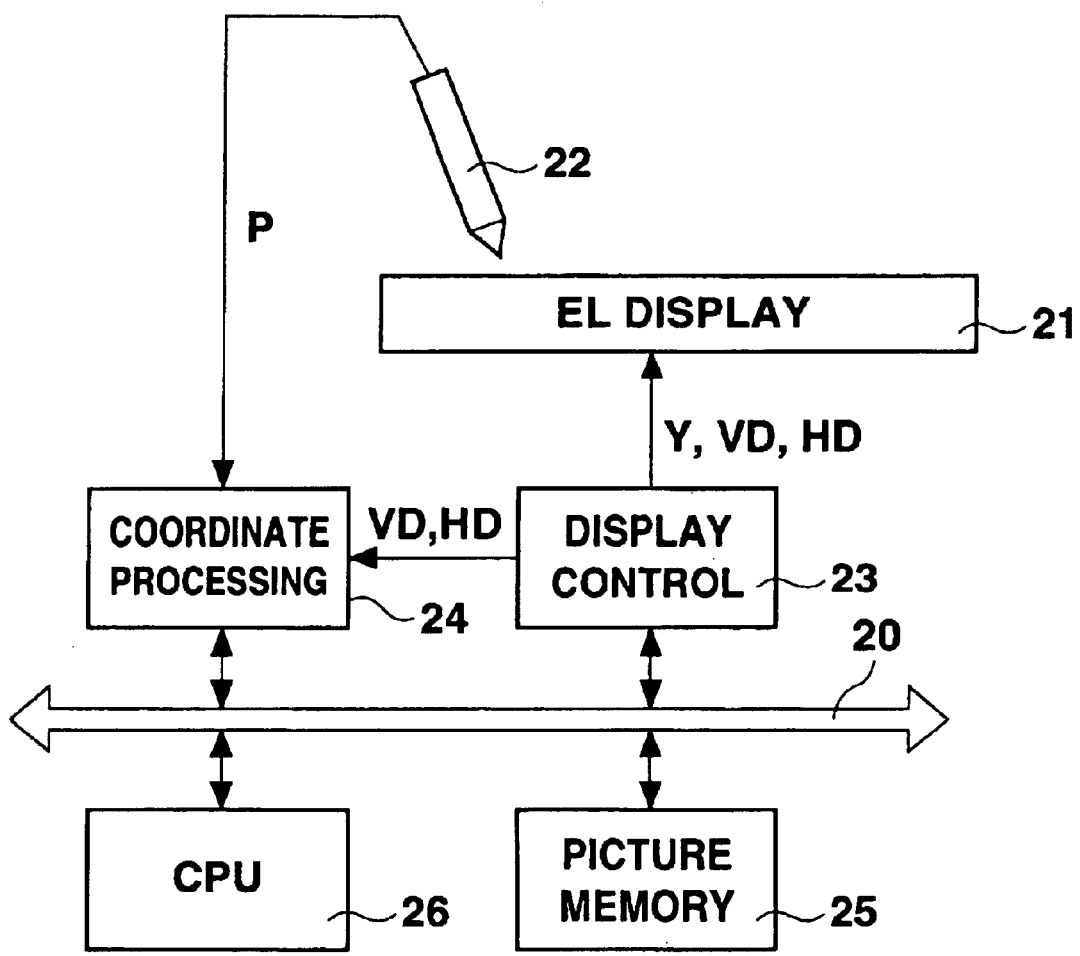
FIG. 1 is a block diagram showing an embodiment of a digitizing apparatus of the present invention.
Figure 5:
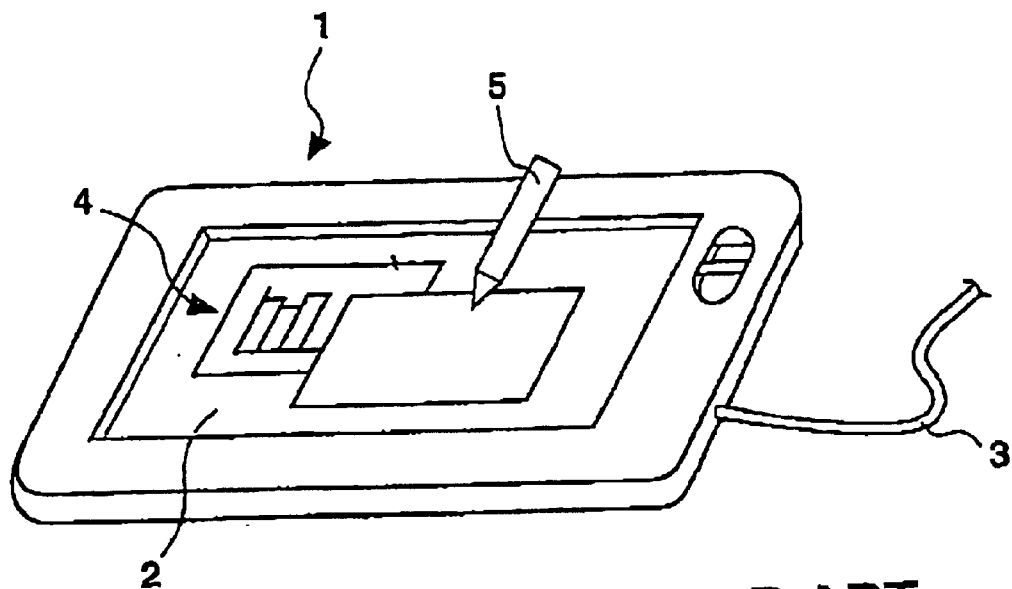
FIG. 5 is a perspective diagram showing the structure of a digitizer.
Figure 6:
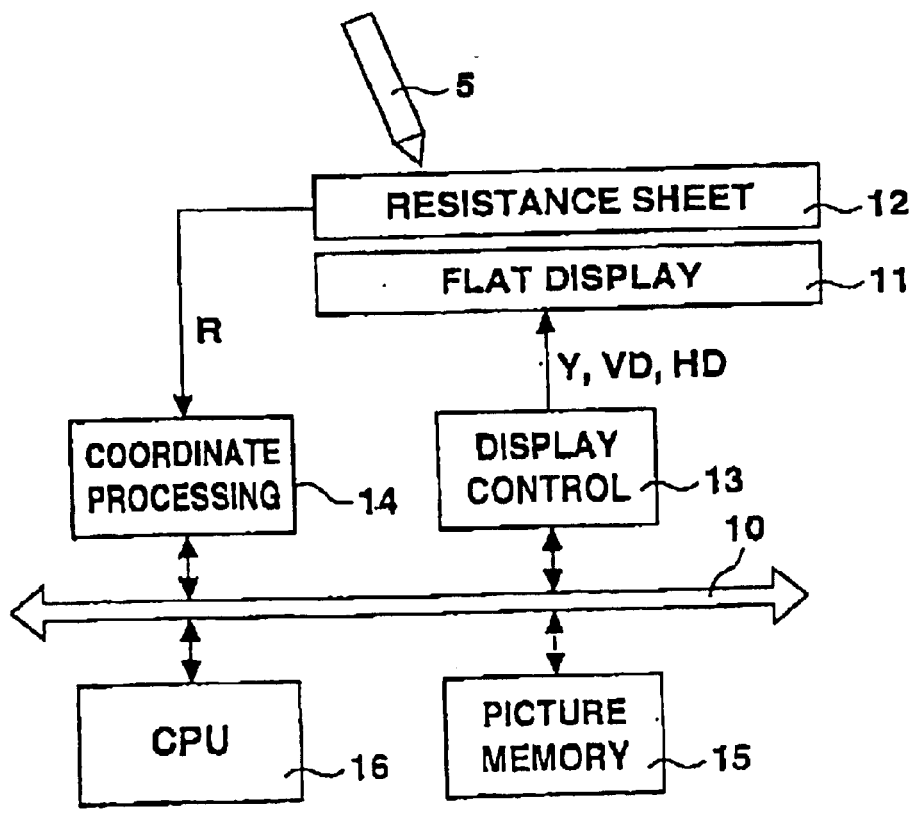
FIG. 6 is a block diagram showing an embodiment of a conventional digitizing apparatus.

FIG. 1 is a block diagram showing an embodiment of the present invention. The digitizer as a digitizing apparatus of the present invention comprises an electroluminescence (EL) display 21, an input pen 22, a display control circuit 23, a coordinate processing circuit 24, a picture memory 25, and a CPU 26. This digitizer has the same form as the digitizer shown in FIG. 5 and has a display surface on which characters and graphics are drawn with the input pen 22. The surface of the EL display 21 uses a transparent substrate (such as a glass substrate) on which is formed emissive elements (EL elements).

The EL display 21 has a plurality of display pixels (EL elements) arranged in a matrix, and forms the display surface of the digitizer. The EL display 21 displays a predetermined picture by causing the plurality of display pixels to emit light in accordance with the picture signal Y that is supplied from the display control circuit 23. The input pen 22 has an optical sensor formed at its tip, and by having it in contact with the surface of the light emitting EL display 21, the emissive state of the display pixel at the position of contact is detected and the detection output P is generated. At the input pen 22, an optical focal length is set so that light reaches the sensor portion when the distance to the surface of the EL display 21 is within a predetermined value. Thus, the optical sensor of the input pen 22 can be prevented from reacting to extraneous light when the tip of the input pen 22 is moved away from the surface of the EL display 21.

Figure 7:
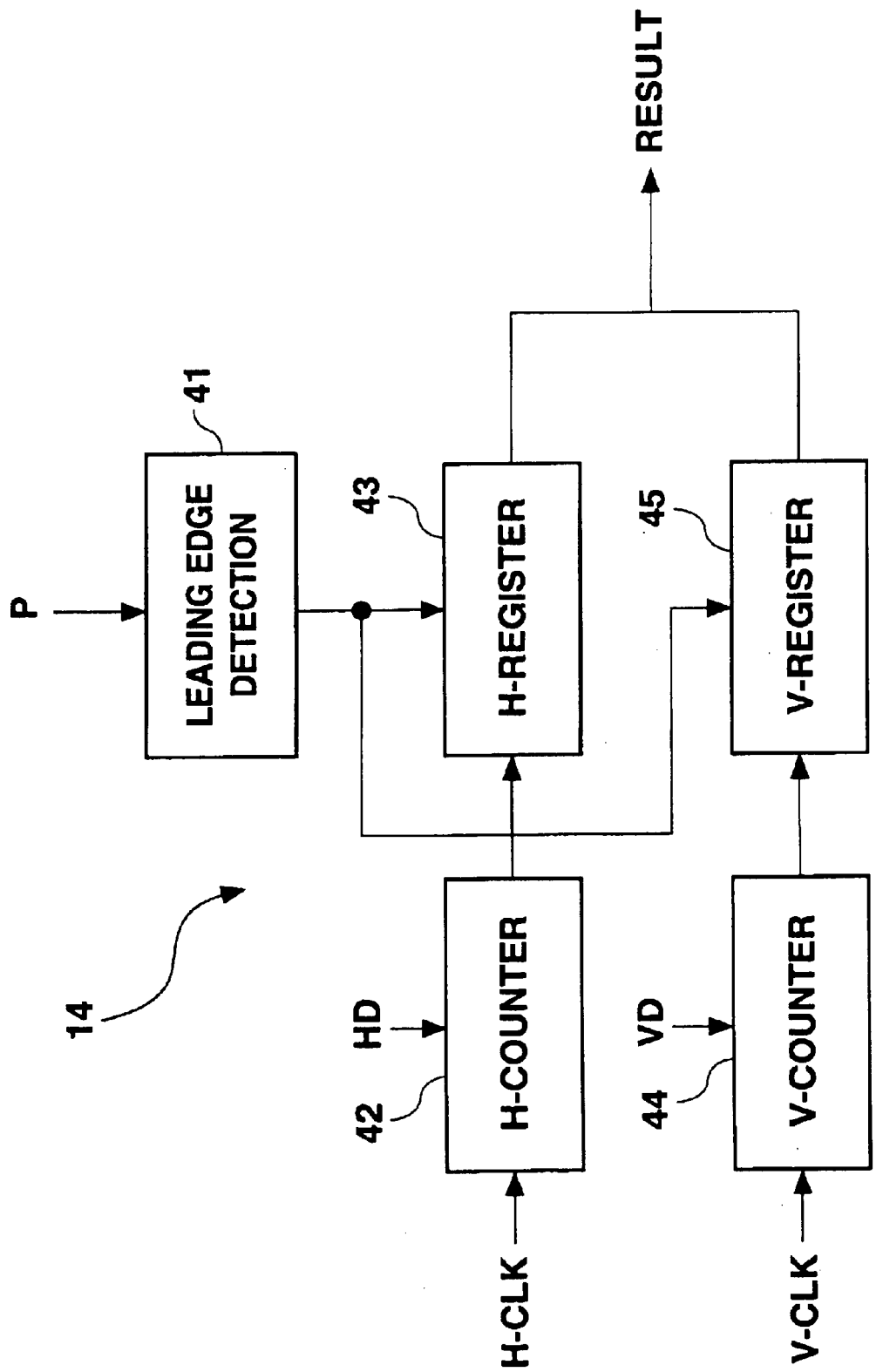
FIG. 7 shows the configuration of the coordinate processing circuit 14.

The configuration of the coordinate processing circuit 24 is now shown in FIG. 7. The detection output P of the input pen 22 is supplied to a leading-edge detection circuit 41. The leading-edge detection circuit 41 detects a leading edge when the magnitude of change in the value of the detection output P is greater than or equal to a predetermined value. On the other hand, an H counter 42 is reset by the horizontal synchronization signal and counts H-CLK, which is a clock corresponding to the display of pixels in dot sequence. To the H counter 42 is connected an H register 43. The H register 43 is loaded with the count value at the time of the H counter 42 on the basis of the signal from the leading-edge detection circuit 41. Furthermore, a V counter 44 is reset by the vertical horizontal synchronization signal and counts V-CLK, which is a clock corresponding to the horizontal synchronization signal in the display of pixels in dot sequence. To the V counter 44 is connected a V register 45. The V register 45 is loaded with the count value at the time of the V counter 44 on the basis of the signal from the leading-edge detection circuit 41.

As a result, when a leading edge in the detection output P of the input pen 22 is detected at the leading-edge detection circuit 41, the count values of the H counter 42 and the V counter 44 are respectively loaded into the H register 43 and the V register 45. The values stored in the H register 43 and the V register 45 correspond to the display pixel position in the horizontal direction and the vertical direction and become the coordinate values of the input pen 22. As soon as the display for one screen completes, the CPU 16 is loaded with the values of the H register 43 and the V register 45 and the coordinate values of the input pen 22 are detected.

In the case where a plurality of leading edges is detected in the detection output P during the display of one screen, only one need be adopted. Furthermore, after a plurality of coordinate values in the horizontal direction and the vertical direction are loaded into the H register 43 and the V register 45 in accordance with a plurality of leading edges, it is sufficient to select one coordinate value from these coordinate values. Furthermore, although it depends on the magnitude of the pixels and resolution of the input pen 22, in the case where the detection region of the input pen 22 corresponds to multiple pixels, it is sufficient for the input pen 22 to recognize a plurality of pixels emitting light and to recognize the position of the input pen 22 as the center of that area.

The display control circuit 23 generates the picture signal Y on the basis of the picture data stored in the picture memory 25, and in accordance with the picture signal Y, also generates the horizontal synchronization signal HD and the vertical synchronization signal VD. The picture signal Y is then supplied together with the horizontal synchronization signal HD and the vertical synchronization signal VD to the EL display 21, and the horizontal synchronization signal HD and the vertical synchronization signal VD are supplied to the coordinate processor 24. Furthermore, the display control circuit 23 performs display operations for coordinate detection on the EL display 21 at the horizontal scanning period and the vertical scanning period. In this coordinate detection operation, the entire surface of the EL display 21 is scanned in a predetermined sequence and pixels of a fixed luminance are display in a dot sequence.

The coordinate processing circuit 24 is connected to the input pen 22 and generates coordinate information on the basis of the change in the detection output P of the input pen 22, the horizontal synchronization signal HD, and the vertical synchronization signal VD. Namely, when the EL display 21 emits light in the coordinate detection operation, and the input pen 22 contacts a certain position on the surface of the EL display 21, the detection output P of the input pen 22 changes at a timing at which the display pixel at the position of contact emits light. The timing of the change is then judged to correspond to a particular horizontal scan and vertical scan on the basis of the horizontal synchronization signal HD and the vertical synchronization signal VD. For example, after being reset at the timing of each leading edge (or trailing edge) of the horizontal synchronization signal HD, the count value of the counter counting only the number of display pixels in the horizontal direction during the horizontal scanning period is loaded at the timing of change in the detection output P of the input pen 22 so that the position in the horizontal direction can be detected. Similarly, after being reset at the timing of each leading edge (or trailing edge) of the vertical synchronization signal VD, the count value of the counter counting with the horizontal synchronization signal HD is loaded at the timing of change in the detection output P of the input pen 22 so that the position in the vertical direction can be detected. These detected positions are sent to a bus 20 as coordinate information in a predetermined format.

The picture memory 25 stores the picture information one screen at a time supplied from the external computer equipment and supplies it to the display control circuit 23 under control of the CPU 26. The CPU 26 is connected via the bus 20 to the display control circuit 23, the coordinate processing circuit 24, and the picture memory 25, and controls the operation of each section in accordance with a predetermined control program. The bus 20 is connected via an interface to the computer equipment and transfers information from the computer equipment to the picture memory 25 and to the CPU 26 as well as transfers coordinate information from the coordinate processing circuit 24 to the computer equipment.

Figure 2:
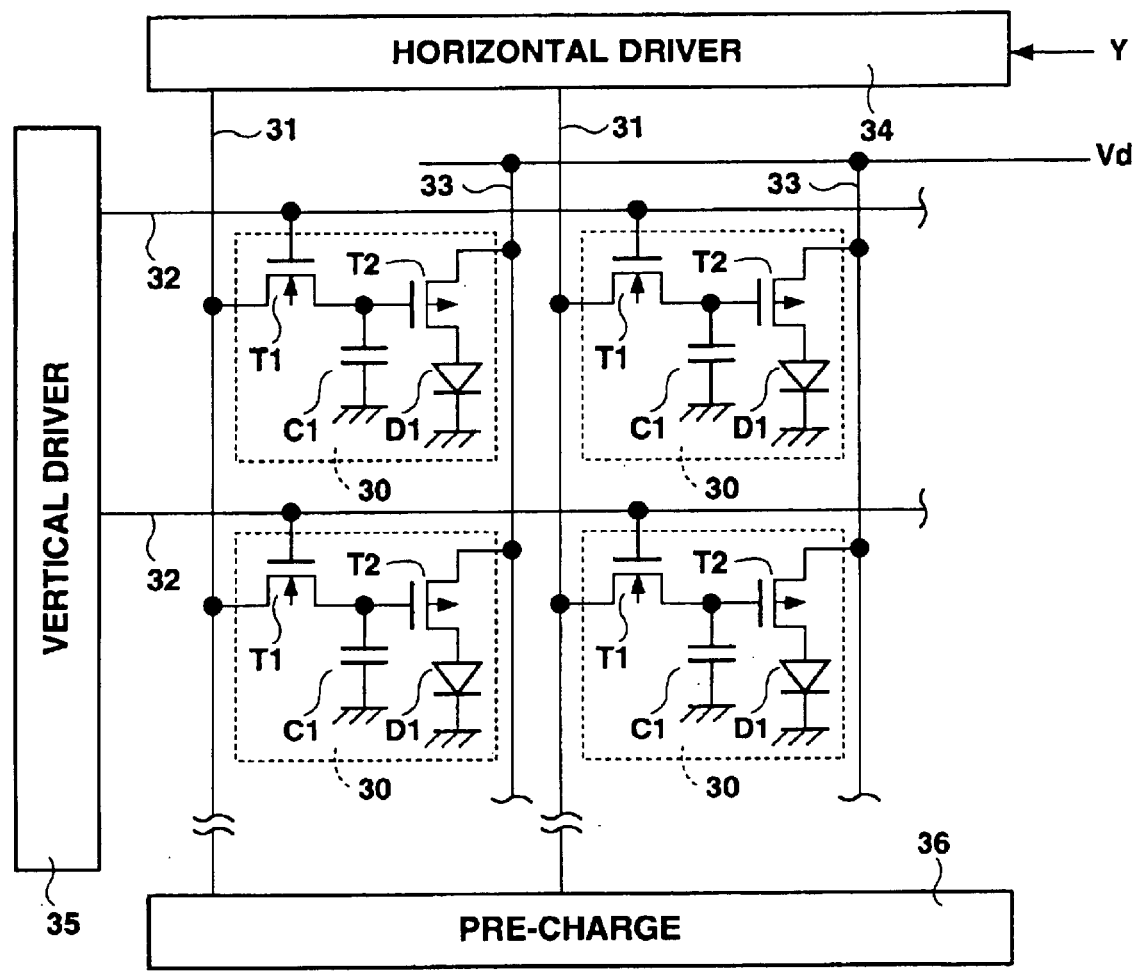
FIG. 2 is an equivalent circuit showing the configuration of an EL display.

FIG. 2 is an equivalent circuit showing the configuration of the EL display 21. The EL display 21 is of the active matrix type and comprises a plurality of display pixels 30 arranged in a matrix, a horizontal driver circuit 34, a vertical driver circuit 35, and a pre-charge circuit 36.

The display pixels 30 respectively have a first transistor T1, a second transistor T2, a capacitor C1, and an EL element D1. The N-channel first transistor T1 and the P-channel second transistor T2 are both thin-film transistors formed on a transparent substrate. To the source of the first transistor T1 is connected the gate of the second transistor T2, and to the drain is connected a drain line 31. Furthermore, to the gate of the first transistor T1 is connected a gate line 32. To the drain of the second transistor T2 is connected a power line 33, and to the source is connected the EL element D1. The capacitor C1 is connected to a point between the source of the first transistor T1 and the gate of the second transistor T2. The drain line 31 is provided in common with each column of the display pixels 30 and is connected to the horizontal driver circuit 34 and to the pre-charge circuit 36. The gate line 32 is provided in common with each row of the display pixels 30 and is connected to the vertical driver circuit 35. The power line 33 is provided in common for all the display pixels 30 and a driving voltage $V_d$ is applied for driving the EL element D1. As a result, when the gate line 31 is selected, the first transistor T1 turns on and the signal voltage from the drain line 31 is applied to the gate of the second transistor T2. The voltage applied to the gate of the second transistor T2 is maintained by the capacitance of the capacitor C1 even after the first transistor T1 turns off. Then, when the second transistor T2 turns on in accordance with the signal voltage that is applied from the drain line 31, the driving voltage $V_d$ from the power line 33 is applied to the EL element D1 via the second transistor T2 so that the EL element D1 emits light in accordance with the signal voltage that is applied to the drain line 31.

The horizontal driver circuit 34 sequentially drives the drain lines 31 in the horizontal scanning period and sequentially applies a voltage according to the picture signal Y to the drain lines 31 in accordance with the scanning direction. The vertical driver circuit 35 sequentially drives the gate lines 32 in the vertical scanning period and sequentially selects the gate lines 32 in accordance with the scanning direction. The pre-charge circuit 36 then applies a predetermined voltage to each display pixel 30 via the drain line 31 and sets each display pixel 30 to a desired state. Thus, the display pixels 30 are driven in dot sequence one line at a time and the signal voltage in accordance with the picture signal Y is sequentially applied to the display pixels 30. As a result, a picture in accordance with the picture signal Y is displayed one screen at a time on the display surface of the EL display 21. Since the response speed of the EL element D1 is fast when compared to liquid crystals, this sort of EL display 21 is suited for performing repetitive coordinate detection operations and picture display operations at high speeds.

Figure 3A:
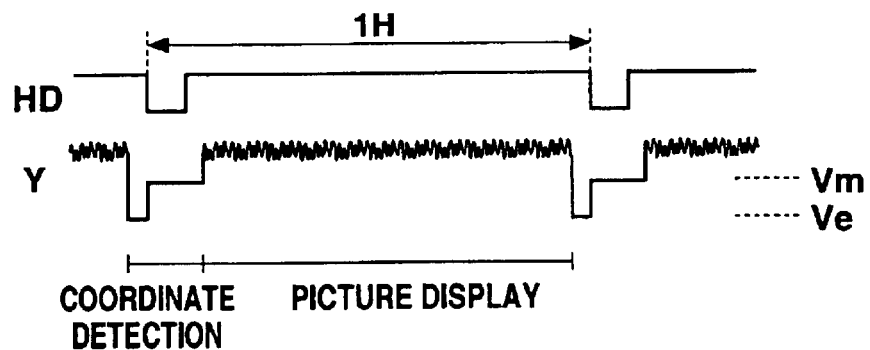
FIGS. 3(a) and 3(b) are timing diagrams illustrating a first operation of the digitizing apparatus of the present invention.

FIGS. 3(a) and (b) are timing diagrams illustrating a first operation of the digitizing apparatus of the present invention. FIG. 3(a) shows the case where the coordinate detection and picture display are completed in one horizontal scanning period and FIG. 3(b) shows the case where the horizontal scanning period for coordinate detection and the horizontal scanning period for picture display are set.

When performing the coordinate detection operation in one horizontal scanning period, as shown in FIG. 3(a), after once turning off each display pixel 30 that was emitting light until that time, the level of the picture signal Y is set so that light is emitted at a predetermined luminance. The erase operation can be performed simultaneously on the columns in selected row units by applying an erase voltage $V_e$ from the pre-charge circuit 36. Then, from the horizontal driver circuit 34 a medium voltage $V_m$ for causing each display pixel 30 to emit light for coordinate detection is applied one column at a time to the row selected by the vertical driver circuit 35. Since each display pixel 30 will emit bright light for a distorted picture if the level of the medium voltage $V_m$ is set high, it is preferable to set the medium voltage $V_m$ to a low level. However, if the medium voltage $V_m$ is set too low, the emissive state will not be detectable by the input pen 22. Thus, the voltage is set so that the minimum emissive state is detectable by the input pen 22. The above-mentioned coordinate detection operation is completed in the horizontal blanking period that is set in the gap of the valid image period of the horizontal scan. The coordinate detection operation can be performed at a high speed by raising the frequency of the clock at which the horizontal driver circuit 34 for the EL display 21 is operated. After the coordinate detection operation is completed, the normal picture display operation is performed. By repeating this sort of coordinate detection operation and picture display operation during one vertical scanning period, a picture in accordance with the picture signal Y is displayed on the display surface of the EL display 21 and the position where the input pen 22 is in contact is detected as coordinate information. In this sort of coordinate detection operation, one coordinate detection is performed at every vertical scanning period.

Figure 3B:
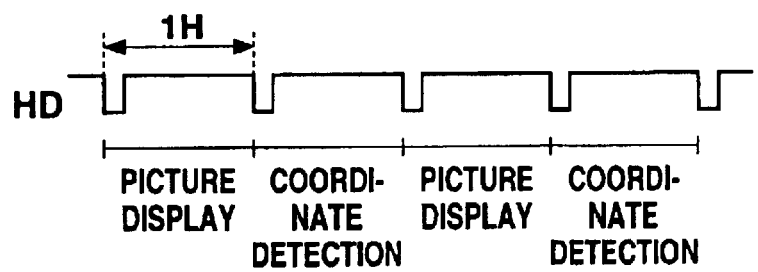

When setting the horizontal scanning period for coordinate detection and the horizontal scanning period for picture display, the horizontal scanning period is set to 1/2, and as shown in FIG. 3(b), after the coordinate detection operation is performed first, the picture display operation is performed for the same row. Namely, compared to the horizontal scanning period during which only the picture display operation is performed, the coordinate detection operation and the picture display operation are alternately repeated at 1/2 periods so that the picture display operation is performed immediately after the coordinate detection operation. The coordinate detection operation itself is identical to the coordinate detection operation shown in FIG. 3(a), and after the erase voltage $V_e$ is applied to each display pixel 30 of the EL display 21, the medium voltage $V_m$ is applied in dot sequence. As a result, similar to the case of FIG. 3(a), the display of the picture in accordance with the picture signal Y on the display surface of the EL display 21 and the coordinate detection of the position where the input pen 22 is in contact are performed simultaneously. Also in the case of this sort of coordinate detection operation, one coordinate detection is performed at every vertical scanning period.

Figure 4A:
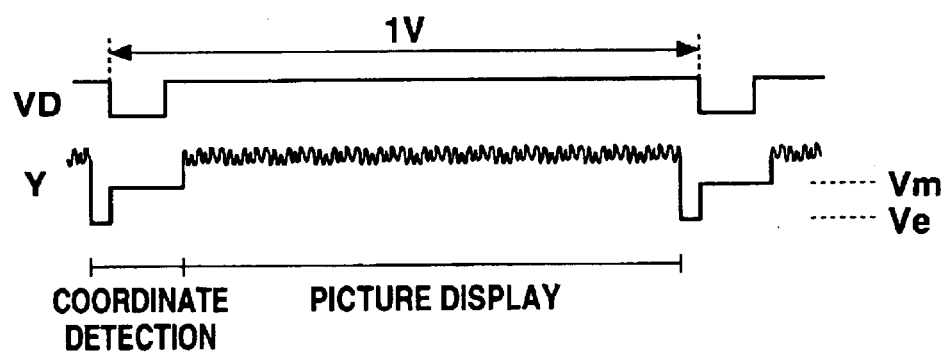
FIGS. 4(a) and 4(b) are timing diagrams illustrating a second operation of the digitizing apparatus of the present invention.
Figure 4B:
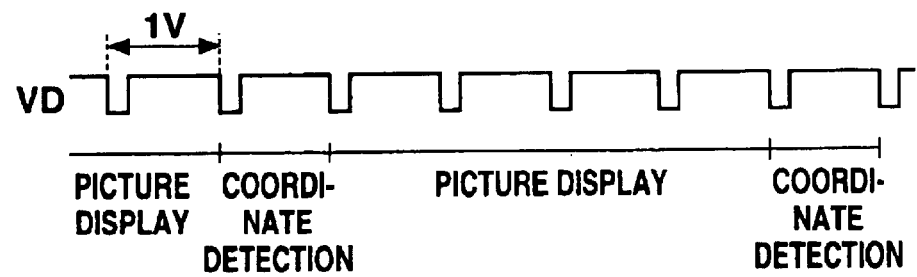

FIGS. 4(a) and (b) are timing diagrams illustrating a second operation of the digitizing apparatus of the present invention. FIG. 4(a) shows a case where the coordinate detection and the picture display are completed within one vertical scanning period, and FIG. 4(b) shows a case where the vertical scanning period for coordinate detection and the vertical scanning period for picture display are set.

When performing the coordinate detection operation in one vertical scanning period, as shown in FIG. 4(a), after once turning off each display pixel 30 that was emitting light until that time, the level of the picture signal Y is set so that light is emitted at a predetermined luminance. The level setting of this picture signal Y is identical with the first operation shown in FIG. 3(a). In the erase operation, the vertical driver circuit 35 is operated while the erase voltage $V_e$ is supplied from the pre-charge circuit 36 and all the display pixels are erased one line at a time. Then, while the vertical driver circuit 35 is operated, the medium voltage $V_m$, in synchronous with this operation, is sequentially supplied from the horizontal driver circuit 34 so that all the display pixels 30 are caused to emit light in dot sequence. The above-mentioned coordinate detection operation is completed in the vertical blanking period that is set in the gap of the valid image period of the vertical scan. After this coordinate detection operation is completed, the normal picture display operation is performed. By repeating this sort of coordinate detection operation and picture display operation, a picture in accordance with the picture signal Y is displayed on the display surface of the EL display 21 and the position where the input pen 22 is in contact is detected as coordinate information. The coordinate detection operation can be performed at a high speed by raising the frequency of the clock at which the horizontal driver circuit 34 and the vertical driver circuit 35 are operated. In the case of this sort of coordinate detection operation, one coordinate detection is performed at every vertical scanning period.

When setting the vertical scanning period for coordinate detection and the vertical scanning period for picture display, the picture display operation is performed in a plurality of vertical scanning periods and the coordinate detection operation is performed in one vertical scanning period. Namely, compared to the conventional vertical scanning period during which only the picture display operation is performed, the vertical scanning period is set short and the coordinate detection is performed between picture display operations. For example, the frame rate is set at 5/4 by setting the vertical scanning period to 4/5, and the coordinate detection operation is performed during only one vertical scanning period after picture display operations are performed during four consecutive vertical scanning periods. The coordinate detection operation itself is identical to the coordinate detection operation shown in FIG. 4(a), and after the erase voltage $V_e$ is applied to each display pixel 30 of the EL display 21, the medium voltage $V_m$ is applied in dot sequence. As a result, similar to the case of FIG. 4(a), the display of the picture in accordance with the picture signal Y on the display surface of the EL display 21 and the coordinate detection of the position where the input pen 22 is in contact are performed simultaneously. In the case of this sort of coordinate detection operation, the coordinate detection operation is performed in accordance with the ratio of the coordinate detection operation to the picture display operation.

The above-mentioned embodiments were illustrated with the EL display 21 having an active matrix system. However, as long as the display of pixels in dot sequence is possible, a simple matrix system is similarly applicable. In the case where the EL display 21 has a simple matrix system, the erase operations shown in FIGS. 3 and 4 become unnecessary since each display pixel does not emit light unless in a selected state.

It should be noted that the light emission in dot sequence of the EL display need not be performed for all pixels in order to perform coordinate detection. Namely, a predetermined reduced number or pixels in the row and/or column direction may be caused to emit light. Furthermore, a plurality of pixels may be caused to emit light as a group in sequence. In particular, when the detection range of the input pen 22 is large compared to the size of a pixel, it is preferable to reduce the number of or group a number of pixels emitting light.

According to the present invention, the structure of the display portion can be simplified and difficulties in viewing the display surface of the display device can be prevented without the need for providing a mechanism for coordinate detection on the surface of the display.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. A digitizing apparatus comprising:
   an electroluminescence display having a plurality of display pixels disposed in a matrix;
   a pen for contacting the display surface of said display and for detecting the emissive state of the display pixel at the position of contact;
   a display control circuit for displaying an image on said display by determining timing of horizontal scanning and vertical scanning and for causing said plurality of display pixels to emit light in dot sequence in accordance with the timing of horizontal scanning and vertical scanning;
   a digitizing processing circuit for generating coordinate information on the basis of change in detection output of said pen with respect to timing of horizontal scanning and vertical scanning of said display control circuit;
   a plurality of display pixels disposed in a matrix and having an emissive layer disposed between a pair of electrodes;
   a horizontal driver circuit for sequentially applying a voltage in accordance with image information to each column of said plurality of display pixels at the timing of horizontal scanning;
   a vertical driver circuit for driving said plurality of display pixels in row units at the timing of vertical scanning; and
   wherein said display control circuit causes said plurality of display pixels to emit light at a predetermined luminance in dot sequence one row at a time during a blanking period of each horizontal scanning period.

2. A digitizing apparatus comprising:
   an electroluminescence display having a plurality of display pixels disposed in a matrix;
   a pen for contacting the display surface of said display and for detecting the emissive state of the display pixel at the position of contact;
   a display control circuit for displaying an image on said display by determining timing of horizontal scanning and vertical scanning and for causing said plurality of display pixels to emit light in dot sequence in accordance with the timing of horizontal scanning and vertical scanning;
   a digitizing processing circuit for generating coordinate information on the basis of change in detection output of said pen with respect to timing of horizontal scanning and vertical scanning of said display control circuit;
   a plurality of display pixels disposed in a matrix and having an emissive layer disposed between a pair of electrodes;
   a horizontal driver circuit for sequentially applying a voltage in accordance with image information to each column of said plurality of display pixels at the timing of horizontal scanning;

a vertical driver circuit for driving said plurality of display pixels in row units at the timing of vertical scanning; and wherein said display control circuit causes said plurality of display pixels to emit light one row at a time in accordance with image information during a first horizontal scanning period and causes said plurality of display pixels to emit light at a predetermined luminance one row at a time in dot sequence during a second horizontal scanning period.

3. A digitizing apparatus comprising:

an electroluminescence display having a plurality of display pixels disposed in a matrix;

a pen for contacting the display surface of said display and for detecting the emissive state of the display pixel at the position of contact;

a display control circuit for displaying an image on said display by determining timing of horizontal scanning and vertical scanning and for causing said plurality of display pixels to emit light in dot sequence in accordance with the timing of horizontal scanning and vertical scanning;

a digitizing processing circuit for generating coordinate information on the basis of change in detection output of said pen with respect to timing of horizontal scanning and vertical scanning of said display control circuit;

a plurality of display pixels disposed in a matrix and having an emissive layer disposed between a pair of electrodes;

a horizontal driver circuit for sequentially applying a voltage in accordance with image information to each column of said plurality of display pixels at the timing of horizontal scanning;

a vertical driver circuit for driving said plurality of display pixels in row units at the timing of vertical scanning; and wherein said display control circuit causes said plurality of display pixels to emit light at a predetermined luminance one screen at a time in dot sequence during a blanking period of each vertical scanning period.

4. A digitizing apparatus comprising:

an electroluminescence display having a plurality of display pixels disposed in a matrix;

a pen for contacting the display surface of said display and for detecting the emissive state of the display pixel at the position of contact;

a display control circuit for displaying an image on said display by determining timing of horizontal scanning and vertical scanning and for causing said plurality of display pixels to emit light in dot sequence in accordance with the timing of horizontal scanning and vertical scanning;

a digitizing processing circuit for generating coordinate information on the basis of change in detection output of said pen with respect to timing of horizontal scanning and vertical scanning of said display control circuit;

a plurality of display pixels disposed in a matrix and having an emissive layer disposed between a pair of electrodes;

a horizontal driver circuit for sequentially applying a voltage in accordance with image information to each column of said plurality of display pixels at the timing of horizontal scanning;

a vertical driver circuit for driving said plurality of display pixels in row units at the timing of vertical scanning; and wherein said display control circuit causes said plurality of display pixels to emit light one screen at a time in accordance with image information during a first vertical scanning period and causes said plurality of display pixels to emit light at a predetermined luminance one screen at a time in dot sequence and during a second vertical scanning period.

5. A digitizing apparatus comprising:

an electroluminescence display having a plurality of display pixels disposed in a matrix;

a pen for contacting the display surface of said display and for detecting the emissive state of the display pixel at the position of contact;

a display control circuit for displaying an image on said display by determining timing of horizontal scanning and vertical scanning and for causing said plurality of display pixels to emit light in dot sequence in accordance with the timing of horizontal scanning and vertical scanning;

a digitizing processing circuit for generating coordinate information on the basis of change in detection output of said pen with respect to timing of horizontal scanning and vertical scanning of said display control circuit;

a plurality of display pixels disposed in a matrix and having an emissive layer disposed between a pair of electrodes;

a horizontal driver circuit for sequentially applying a voltage in accordance with image information to each column of said plurality of display pixels at the timing of horizontal scanning;

a vertical driver circuit for driving said plurality of display pixels in row units at the timing of vertical scanning; and wherein said display control circuit, when causing said plurality of display pixels to emit light in dot sequence, causes said plurality of display pixels to emit light at a predetermined illuminance after once setting said plurality of display pixels to a non-emissive state.

6. A digitizing apparatus according to claim 5 wherein said electroluminescence display further comprises a pre-charge circuit for supplying a predetermined voltage to said plurality of display pixels, and voltage is supplied from said pre-charge circuit to said plurality of display pixels so as to set each display pixel to a non-emissive state.

* * * * *